United States Patent [19]
Blevins

[11] 4,079,498
[45] Mar. 21, 1978

[54] METHOD FOR HINGEDLY ASSEMBLING MEMBERS

[75] Inventor: Theodore J. Blevins, Prospect, Ky.

[73] Assignee: General Electric Company, Louisville, Ky.

[21] Appl. No.: 774,583

[22] Filed: Mar. 7, 1977

Related U.S. Application Data

[62] Division of Ser. No. 687,693, May 19, 1976, Pat. No. 4,041,571.

[51] Int. Cl.² .............................................. B23P 19/00
[52] U.S. Cl. .................................. 29/434; 29/526 R; 16/128 R; 220/334
[58] Field of Search ............... 29/434, 526; 16/128 R, 16/171, 172; 220/334, 337

[56] References Cited

U.S. PATENT DOCUMENTS

| 1,406,683 | 2/1922 | Regan | 220/334 |
|---|---|---|---|
| 1,441,599 | 1/1923 | Platt | 220/337 |
| 1,686,969 | 10/1928 | Hebden | 220/334 |
| 2,722,034 | 11/1955 | May | 16/171 |
| 3,562,955 | 2/1971 | Blomgren | 220/334 X |
| 3,878,585 | 4/1975 | Morris | 16/128 R |
| 3,921,253 | 11/1975 | Nelson | 16/172 |

*Primary Examiner*—Charlie T. Moon
*Attorney, Agent, or Firm*—Frederick P. Weidner; Francis H. Boos

[57] ABSTRACT

A fastening device and method is provided for fastening first and second members in hingedly assembled relationship. The fastening device includes a slot opening through the first member, an integrally formed hinge member having a first planar portion with an end, a second planar portion, and an intermediate portion with its longitudinal axis at the junction of the first and second portions. The first and intermediate portions are dimensioned to pass through the slot while the second portion is larger than the slot. The intermediate portion is in the slot and the second portion of the hinge is secured to the second member.

7 Claims, 7 Drawing Figures

METHOD FOR HINGEDLY ASSEMBLING MEMBERS

CROSS REFERENCE TO RELATED APPLICATION

This application is a Division of copending patent application Ser. No. 687,693 for "Fastening Device and Method for Hingedly Assembling Members," filed May 19, 1976, now Pat. No. 4,041,571 in the name of Theodore J. Blevins, and assigned to the assignee of this application.

BACKGROUND OF THE INVENTION

1. Field of the Invention

The present invention relates to a fastening device and method for connecting a pair of members in assembled relationship and more particularly, to such a fastening device and method for connecting a pair of members in a hingedly assembled relationship such that a first of the members may be rotated with respect to the other member about the fastening device.

2. Description of the Prior Art

Of the many applications wherein it is desirable that one member be secured to another member in a hinged relationship with respect thereto, there is included an application, such as in a domestic clothes dryer, wherein the top portion of the outdoor cabinet thereof is secured to the bottom or base portion of the cabinet. Often, however, there arises the need for raising the top for gaining access to the interior of the cabinet of the dryer wherein the operating components are located. In such an application it is desirable that the top of the dryer be hingedly attached to the base portion since the top is not easily removed therefrom because of electrical wiring extending from the top to the components in the base of the cabinet. In addition to the desirability of hingedly attaching the top of the dryer to the base portion for ease of servicing or repairing the dryer, it is also desirable that the top be easily removed from its engagement with the base portion and be easily assembled again should the need arise.

There is a need then for a fastening device for securing the top of the dryer cabinet to the base portion of the cabinet with ease of assembly while at the same time allowing secure hinged movement of the top with respect to the base portion and further allowing the disengagement of the top from the base portion easily when that need is necessary.

The prior art has disclosed many and varied forms of fastening devices. Some representative fastening devices are shown in U.S. Pat. Nos. 1,686,969; 3,878,585; and 3,921,253.

It is desirable to have a fastening device and method of hingedly assembling members, such as the top and base of a clothes dryer cabinet, wherein the fastening device includes an integrally formed hinge member that is easily formed from sheet metal and which may be assembled quickly and simply.

By the present invention, there is provided an improved fastening device and method for connecting a pair of members, such as the top and base portion of a domestic clothes dryer cabinet, in hingedly assembled relationship such that the top may be pivoted about the base portion and be retained in an open position for access to the interior of the dryer without the necessity of completely removing the top for such access. The fastening device is of simple and economical construction and the method of assembling the fastening device is fast and efficient, thus reducing the labor necessary to make the hinged connection.

SUMMARY OF THE INVENTION

In accordance with the present invention there is provided a fastening device for hingedly connecting a first member to a second member in hingedly assembled relationship. The fastening device includes an integrally formed hinge member having a first planar portion with an end, a second planar portion, and an intermediate portion with its longitudinal axis at the junction of the first and second portions. The first and intermediate portions of the hinge member are dimensioned to pass through a slot opening provided in the first member. The first portion has one side straight from the end to the intermediate portion and at a right angle to the longitudinal axis thereof. The other side of the first portion is curved from the end to the intermediate portion. The second portion of the hinge member is dimensioned to be larger than the slot opening so that it cannot pass therethrough. Means are provided for securing the second portion to the second member after the first portion of the hinge member has passed through the slot opening. The method of hingedly securing the first member to the second member is by inserting the end of the first portion of the hinge member through the slot opening in the first member, then rotating the hinge member in the plane of the first portion until abutment of the second portion of the hinge member with the first member. The hinge member is then pivoted about the longitudinal axis of its intermediate portion and the second portion of the hinge member secured to the second member in any suitable manner, such as by a sheet metal screw.

DESCRIPTION OF THE PREFERRED EMBODIMENT

Figure 1:
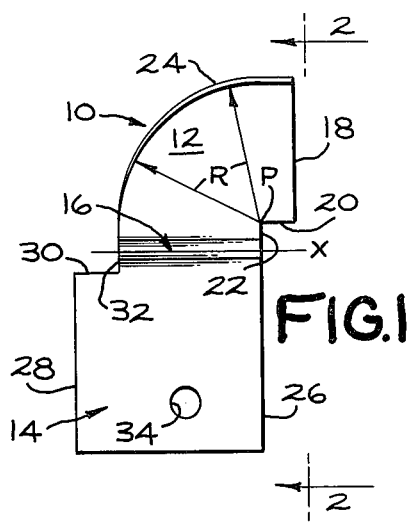
FIG. 1 is a top plan view of the hinge member of the preferred embodiment of the fastening device of the present invention.
Figure 2:
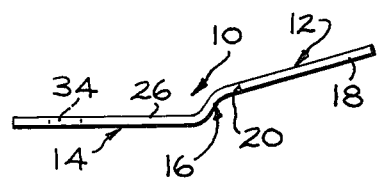
FIG. 2 is a side elevational view of the hinge member taken along lines 2—2 of FIG. 1.

Referring now to FIGS. 1 and 2 in particular, there is shown an integrally formed hinge member 10 having a first planar portion 12, a second planar portion 14, and an intermediate portion 16 with its longitudinal axis located at the junction of the first and second planar portions. The first planar portion 12 has an end 18 which is, as viewed in FIG. 1, at a right angle with respect to the longitudinal axis, designated X in FIG. 1, of the intermediate portion 16. Extending from the end 18 to the intermediate portion is a straight side 20, which as shown in FIG. 1, intersects side 22 of the intermediate portion at point 1 and is at a right angle with respect to the one side 22 of the intermediate portion 16 and parallel to the longitudinal axis X. Side 20 acts as a shoulder, the function of which will be discussed later. The other side 24 of the first planar portion 12 is curved from the end 18 to the intermediate portion 16. The curve or radius of side 24 is generated by a point on a radial line designated R, from the point P. Any point on the curved side 24 is equally distant from the intersect point P between straight side 20 and intermediate portion side 22. The second planar portion 14 is generally square in shape and is wider than the intermediate portion 16 in its longitudinal direction. The second planar portion 14 is formed so that the one side 26 is even with the one side 22 of the intermediate portion. That is, side 26 is interconnected and parallel to side 22. By this configuration the hinge member 10 is provided with a second shoulder 30 that extends from one side 32 of the intermediate portion to the side 28 of the second planar portion and is parallel to the longitudinal axis X of the intermediate portion. The second planar portion has an aperture 34 preferably off-center for receiving a sheet metal screw as will be described later.

As can best be seen in FIG. 2, first planar portion 12 diverges from the plane of the second planar portion in a direction away from the intermediate portion, the purpose of which will also be described later. The intermediate portion 16 is S-shaped as viewed in vertical cross section.

Figure 3:
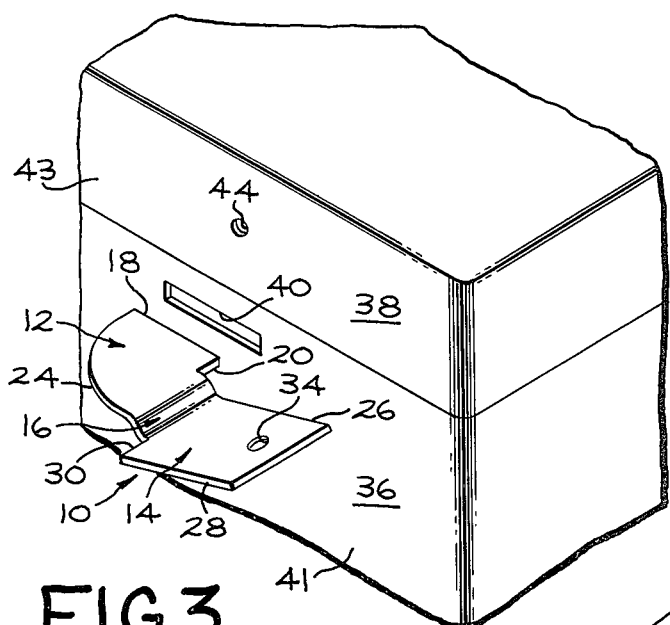
FIG. 3 is a perspective view of the fastening device of the present invention and shows the hinge member in position to be inserted through a slot opening in one of the two members to be hingedly secured to each other.
Figure 4:
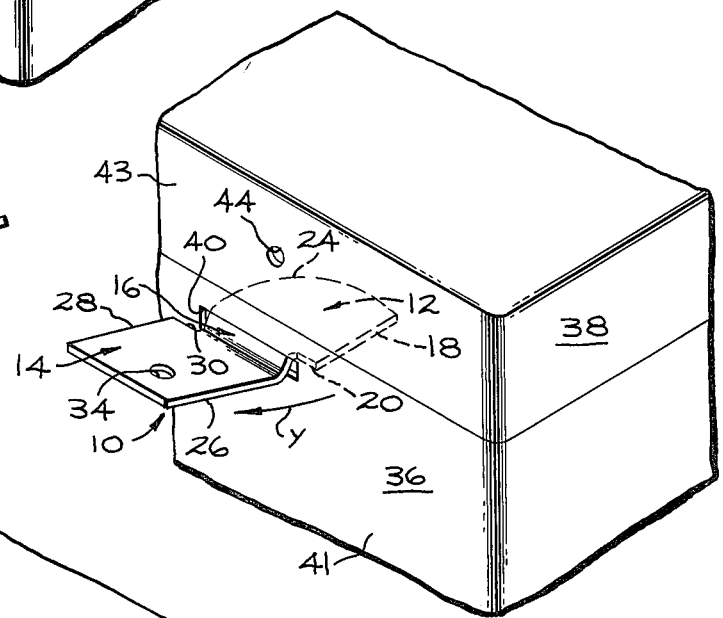
FIG. 4 is a perspective view of the fastening device of the present invention and shows the position of the hinge member after the end of the hinge member has been inserted through the slot opening and the hinge member rotated.
Figure 5:
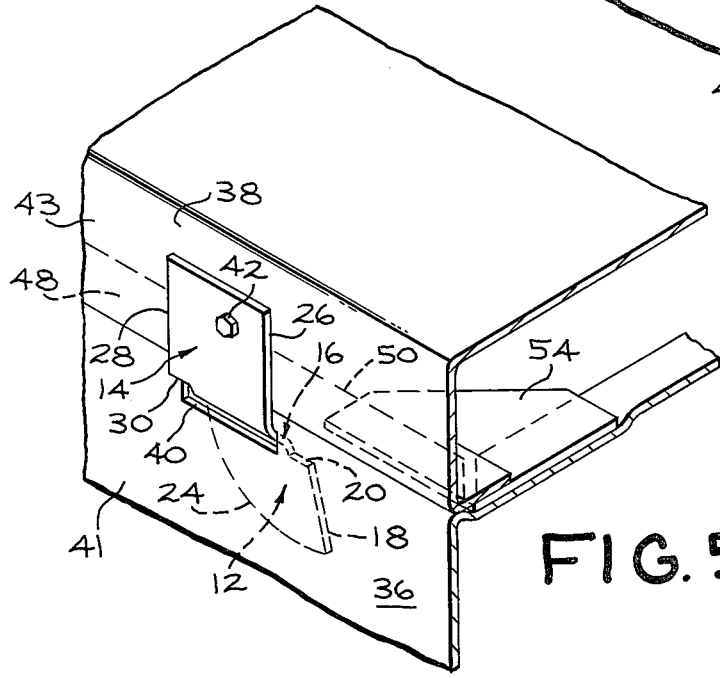
FIG. 5 is a perspective view showing the final assembly of the fastening device of the present invention.

With reference to FIGS. 3, 4 and 5, the method of assembling the fastening device will be described. As shown in FIG. 3, two members to be hingedly connected to each other are positioned one on top of the other. In the preferred embodiment the first member 36 is the base of a cabinet and the second member 38 is the top of the cabinet. The first member 36 has a slot opening 40 through its rear wall 41. The slot opening 40 is slightly larger than the end 18 of the hinge member 10. The hinged member 10 is positioned by the person doing the assembling as shown in FIG. 3. With the end 18 slightly smaller than the slot opening 40 and since, as described above, the distances between any point on side 24 of the first planar portion 12 and the intersection of straight side 20 and intermediate portion 16, side 22 at point P are equal, the entire first planar portion 12 can pass through the slot opening 40. Once the end 18 is passed through the slot opening 40, the hinge member is rotated through an angle of approximately 90° in the direction shown by the arrow Y in FIG. 4 until it assumes the position as shown in FIG. 4. This position is assured by the abutment of shoulder 30 against the rear wall 41 of the first member 36. When the hinge is in that position the hinge member is then pivoted about the longitudinal axis X of the intermediate portion 16. When that movement is completed the second planar portion 14 comes in contact or abuts the rear wall 43 of the second member 38 as shown in FIG. 5. In this configuration the intermediate portion 16 of the hinge member 10 is located in the slot 40 and the first and second planar portions 12 and 14 respectively are on opposite sides of the first member 36. To complete the assembly a sheet metal screw 42 is inserted through aperture 34 in the second planar portion and into an aperature 44 that was previously provided in the second member 38 to be hingedly joined. While other suitable securing means for the second planar portion to the second member 38 may be provided, this particular securing means has an advantage in that by providing the aperture 34 to be offset from the center of the second planar portion, the registration of that aperture with the preformed aperture 44 in the second member will allow the insertion of the sheet metal screw 42 through both apertures 34 and 44 only when the hinge member and fastening device have been properly assembled.

Figure 6:
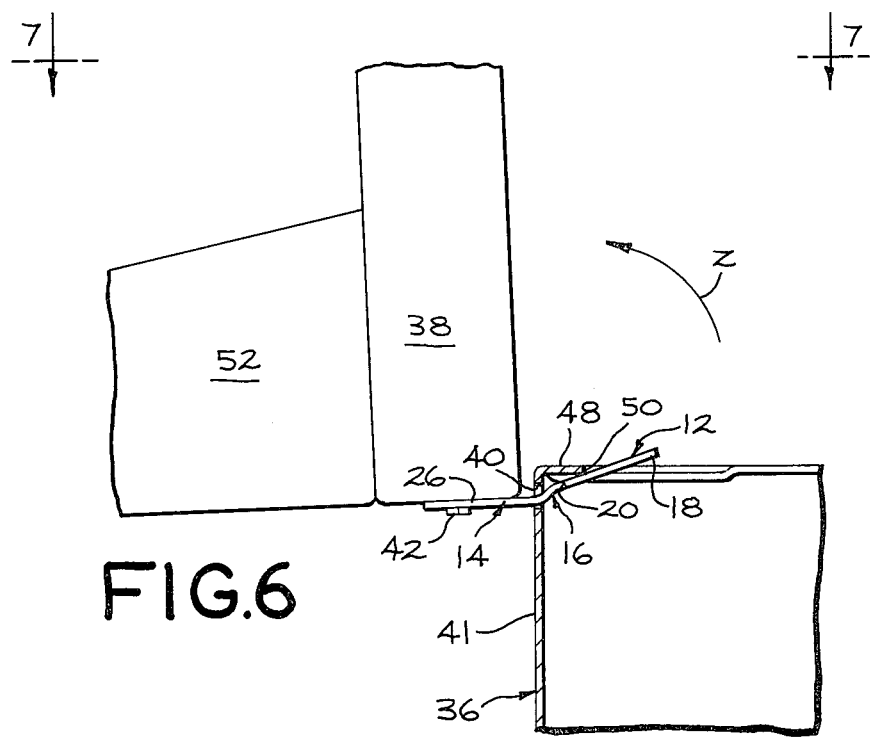
FIG. 6 is a side elevational view of a domestic clothes dryer cabinet partly in section and broken away to show the application of the fastening device of the present invention in its preferred embodiment.

Once the fastening device is properly assembled as shown in FIG. 5, then should it become desirable to raise or pivot the second member 38 relative to the first member 36, then the fastening device will assume a position as shown in FIG. 6. Ordinarily a clothes dryer cabinet bottom, which in this FIG. 6 is the first member 36, will have a rear wall 41 that will have an inwardly directed flange 48 which will extend inwardly of the rear wall 41. When, as shown in FIG. 6, the second member 38 is raised in the direction of the arrow Z far enough, the first planar portion 12 of the hinge member 10 will come into contact with the leading edge 50 of the flange 48 and prevent any further movement of the second member 38 in a direction of the arrow Z in FIG. 6. Thus it can be seen that when the second membert 38 reaches the position shown in FIG. 6, the second member 38 is slightly beyond the vertical plane of the rear wall 41. Thus the second member 38 will stay in that position until manually closed or pivoted in a direction opposite from that of the arrow Z.

In order for the second member 38 to assume the position beyond the vertical plane of the rear wall 41, the first planar portion 12 is formed to diverge from the plane of the second planar portion by an included angle of about 12 degrees. The preferred embodiment of the fastening device allows the second member 38 to be pivoted relative to the first member 36 by between 90° and 145°. The divergence of the first relative to the second planar portion of the hinge member should be sufficient to allow this pivotal movement. Of course, the closer to 90°, as shown in FIG. 6, the better, as less structural strength of the component parts is needed, and yet the second member will remain in its open or raised position. The amount of divergence of the first planar portion relative to the second planar portion will depend upon the width of the flange 48 and the distance of the slot opening 40 from the flange 48. In any given structural arrangement these dimensions can be readily determined to give the desired hinge function of the fastening device.

Figure 7:
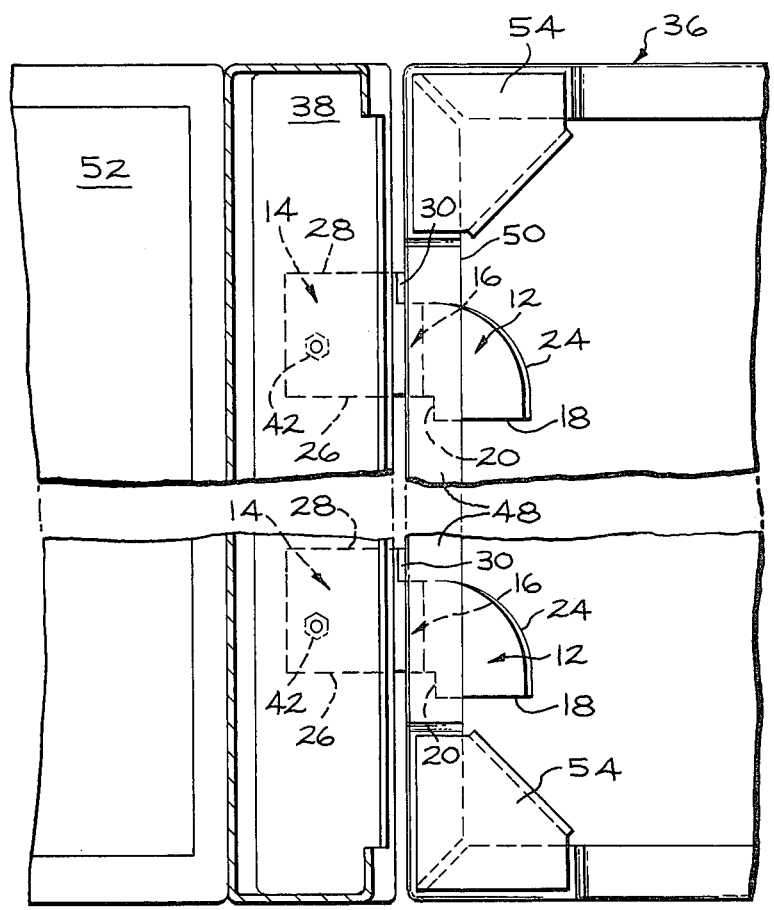
FIG. 7 is a top plan view taken along lines 7—7 of FIG. 6 showing two fastening devices on a domestic clothes dryer cabinet with the cabinet being fragmented.

In FIGS. 6 and 7, the preferred embodiment of the fastening device is shown arranged in connection with an automatic clothes dryer wherein the second member 38 has a control console 52 attached thereto and which contains most of the control components and circuitry necessary to conduct the clothes dryer through its operational cycles. The control console 52 normally has a wiring harness (not shown) that extends from the control console 52 through the cabinet top and into the cabinet base where the various mechanisms for implementing the operational cycles are housed. It is, therefore, highly desirable that when the top or second member 38 is opened for access to the mechanisms in the base that it remain in its open position while maintenance or service is performed on those mechanisms. It is important that the top does not fall as it could disrupt the electrical connections or sever the wires in the electrical harness. The base of the cabinet of the clothes dryer is formed of sheet metal on all four sides which has the upper end thereof formed with inwardly directed flanges, such as flange 48 on the rear wall 41. These flanges are reinforced by a gusset member 54 at each corner of the cabinet to help structurally stabilize the cabinet base. As will be understood, these gusset members 54 will reinforce the flange 48 of rear wall 41 to help support the second member 38 in its raised position as shown in FIGS. 6 and 7. In the preferred embodiment as shown in FIG. 7, there are two fastening devices employed and these are located in close proximity to the gussets 54 at the rear corners of the cabinet base.

It will be noted that once the fastening device has been completely assembled as described heretofore, the first planar portion 12 cannot be withdrawn through the slot opening 40 as straight side 20 acts as a shoulder and will abut against the first member 36 adjacent the slot 40. In addition, the second member 38 cannot be moved forward of the rear wall 41 as the second planar portion 14 abuts up against both the first and second members to be hingedly connected.

It should be apparent to those skilled in the art that the embodiment described heretofore is considered to be the presently preferred form of this invention. In accordance with the Patent Statutes, changes may be made in the disclosed apparatus and the manner in which it is assembled without actually departing from the true spirit and scope of this invention.

What is claimed is:

1. The method of hingedly securing a first member to a second member comprising:
    a) making a slot opening in the first member,
    b) forming an integrally formed hinge member having a first planar portion with an end, a second planar portion, and an intermediate portion with its longitudinal axis at the junction of the first and second portions, said first portion having a shoulder formed on one side between the terminal end and the intermediate portion and the other side being curved between the terminal end and the intermediate portion, said first and intermediate portions being dimensioned to pass through the slot opening and the second portion dimensioned to be larger than the slot opening,
    c) inserting the end of the first portion through the slot opening,
    d) rotating the first portion of the hinge member through the slot opening to position the hinge member such that the intermediate portion is in the slot and the first and second planar portions are on opposite sides of the first member,
    e) pivoting the hinge member about the longitudinal axis of the intermediate portion, and
    f) securing the second portion of the hinge member to the second member.

2. The method of claim 1 wherein securing the second portion of the hinge member is by a sheet metal screw through the second portion of the hinge member and the second member.

3. The method of claim 1 including the step of forming a depending flange on the first member at a right angle with respect to the first member such that the first portion of the hinge member abuts said flange to prevent further pivotal movement of the first member with respect to the second member.

4. The method of claim 1 including rotating the first portion of the hinge member through the slot opening until abutment of the first member and second portion of the hinge member.

5. The method of claim 1 including forming the hinge member so that the first portion as viewed in vertical cross section is in a plane that intersects the plane of the second portion and diverges from the plane of the second portion in a direction away from the intermediate portion.

6. The method of claim 5 including forming the intermediate portion of the hinge member as an S-shape as viewed in vertical cross section.

7. The method of claim 5 including forming the hinge member so that the divergence of the first portion with respect to the second portion is sufficient to allow pivotal movement of the second member relative to the first member of between 90° and 145°.

* * * * *